United States Patent Office 3,137,695
Patented June 16, 1964

3,137,695
NOVEL FUNGICIDAL AMINO DERIVATIVES OF THIOCYANO-S-TRIAZINES
Werner Schwarze, Frankfurt am Main, Germany, assignor to Deutsche Gold- und Silber-Scheideanstalt vormals Roessler, Frankfurt am Main, Germany
No Drawing. Original application Aug. 22, 1962, Ser. No. 218,576. Divided and this application Nov. 20, 1962, Ser. No. 249,546
6 Claims. (Cl. 260—249.8)

The present invention relates to novel amino derivatives of thiocyano triazines having fungicidal properties of the general formulae

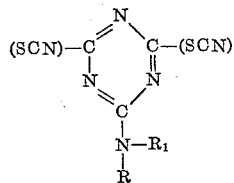

and

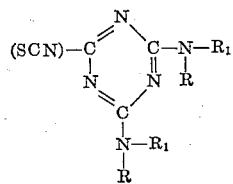

wherein (SCN) represents the Rhodano radical

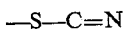
—S—C≡N or the isothiocyanate radical —N=C=S, R is selected from the group consisting of lower alkyl, chloro lower alkyl, cyano lower alkyl, phenyl, ethoxy phenyl, and chloro phenyl and $R_1$ is selected from the group consisting of hydrogen, lower alkyl, chloro lower alkyl, cyano lower alkyl, phenyl, ethoxy phenyl and chloro phenyl and a method of combatting fungi therewith.

Preferably the compounds according to the invention are the mono thiocyano diamino triazines in which the amino groups are substituted by lower alkyl groups, the total number of carbon atoms of which is 4 to 8, and particularly those in which one of the amino groups is an ethyl amino

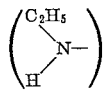

group as these compounds combine especially high fungicidal activity with low phytotoxicity. The following are illustrative of such preferred compounds:

2-thiocyano-4-ethyl amino-6-dimethyl amino-s-triazine
2-thiocyano-4-ethyl amino-6-diethyl amino-s-triazine
2-thiocyano-4-ethyl amino-6-isopropyl amino-s-triazine
2-thiocyano-4-ethyl amino-6-sec. butyl amino-s-triazine
2-thiocyano-4-ethyl amino-6-isobutyl amino-s-triazine
2-thiocyano-4-methyl amino-6-diethyl amino-s-triazine
2 - thiocyano-4-dimethyl amino-6-dimethyl amino-s-triazine
2 - thiocyano-4-isopropyl amino-6-isopropyl amino-s-triazine
2 - thiocyano-4-isopropyl amino-6-tert. butyl amino-s-triazine
2 - thiocyano-4-n-butyl amino-6-diethyl amino-s-triazine.

The novel-s-triazine compounds can easily be prepared by reacting an alkali metal or alkaline earth metal or ammonium thiocyanate with triazine compounds of the formulae

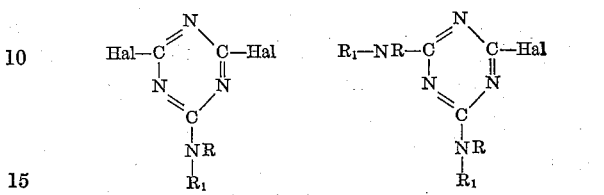

in which R and $R_1$ have the same significance as above and Hal denotes halogen, preferably chlorine or bromine, in the presence of a lower alkanol, preferably methanol, as a solvent. The reaction can be carried out at any temperature between the freezing point and the boiling point of the mixture. The reaction takes place smoothly even at temperatures as low as −40° C. However, in order to accelerate the reaction it often is advantageous to use elevated temperatures.

The novel compounds according to the invention can be produced by still another method, namely, by reacting s-triazine derivatives of the formulae

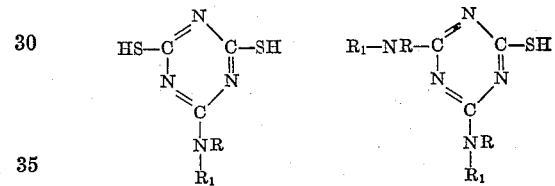

with a cyanogen halide, such as cyanogen chloride or bromide, in the presence of a solvent, such as water, lower alkanols, for example, methanol, ethanol, and ketones, for example, acetone, and methyl ethyl ketones. The reaction with the cyanogen halide is advantageously carried out in the presence of a hydrogen halide acceptor at temperatures below room temperature to prevent any reaction of the cyanogen halide and the solvent. Preferably, temperatures between about −5° C. and +10° C. are employed.

The compounds according to the invention possess excellent fungicidal properties and therefore are useful as fungicides. For example, in spore tests carried out on wall flower (cheiranthes cheiri) leaves infected with spores of alternaria brassicicola employing dispersions of the compounds in water, it was found that the compounds, for example, cyan-methyl-amino dithiocyano triazine, beta-chloro-ethyl-amino dithiocyano triazine and bis-isopropylamino thiocyano triazine, provided effective control at concentrations below 5000 p.p.m.

Also, in tests against the fungus alternaria tenuis the following results were obtained:

| Compound | LD 100 amount, γ per cm.² | Period observed, hours |
|---|---|---|
| p-Chloro-anilido-di-thiocyano triazine | 20 | 20 |
| o-Chloro-anilido-di-thiocyano triazine | 0.4–0.8 | 20 |

The dialkyl amino thiocyano triazines are active in combatting mildew, as greenhouse tests with cucumber plants have shown. They are more active than the best compounds available. Of value is their low phytotoxicity.

The following table illustrates the activity. The numbers on the head of the table indicate the concentrations of the active substances in the used kerosene/water emulsions, which were stabilized by addition of polyglycol ethers.

| Active Compound | Powdery mildew infection | | | | Phytotoxicity, percent |
|---|---|---|---|---|---|
| | 0.03% | 0.06% | 0.09% | 0.12% | |
| | Number of lesions after spraying | | | | |
| 2,4-bis-isopropylamino-6-thiocyano-triazine | 1 | 0 | 0 | 0 | 0.09 |
| 2,4-bis-ethyl-amino-6-thiocyano-triazine | 18 | 9 | 1 | 2 | 0.06 |
| 2-ethyl-amino-4-isobutyl-amino-6-thiocyano-triazine | 0 | 0 | 0 | 0 | <0.12 |
| 2-ethyl-amino-4-tert.butyl-amino-6-thio-cyano-triazine | 0 | 0 | 0 | 0 | 0.1 |
| 2-ethyl-amino-4-isopropyl-amino-6-thio-cyano-triazine | 0 | 0 | 0 | 0 | <0.09 |
| Untreated | 65 | 65 | 65 | 65 | |

The claimed compounds can be used as fungicides in the form of solutions, suspensions, dispersions and on solid carriers.

The following examples will serve to illustrate several embodiments of the invention.

*Example 1*

275 g. of dichloro-o-chloro-anilido triazine were boiled with a solution of 200 g. of potassium thiocyanate in 2.4 liters of methanol for two hours under reflux. The reaction mixture was then cooled and the precipitated KCl filtered off. The filtrate was concentrated under vacuum to 750 cc. and cooled. The crystals formed were vacuum filtered and washed with methanol and water and recrystallized from methanol. Yield 198 g. of 2.4 di(SCN)-6-o-chloroanilido-s-triazine of a M.P. of 122–123° C. The yield therefore was 61.7% of the theoretical.

*Example 2*

275 g. of dichloro-p-chloro-anilido triazine were heated with 160 g. of ammonium thiocyanate in 2 liters of methanol as described in Example 1. Yield 183 g. 2.4 di(SCN)-6-p-chloro-anilido-s-triazine of a M.P. of 192° C. The yield therefore was 57.1% of the theoretical.

*Example 3*

28.5 g. of dichloro-phenetidino-triazine were introduced in a solution of 20 g. potassium thiocyanate in 400 cc. of methanol and the mixture boiled for 2 hours under reflux. Yield 15.6 g. (47.3% of the theoretical) of 2.4 di(SCN)-6-phenetidino-s-triazine of a M.P. of 162° C.

*Example 4*

54 g. of o-chloro-anilino-dimercaptotriazine were dissilved in 500 ml. of 0.8 N sodium hydroxide. The solution was cooled to 0° C. and 30 g. of cyanogen chloride were gradually added thereafter. During the reaction the temperature climbed to +10° C. After a total elapsed time of 30 minutes the resulting precipitate was filtered off on a suction filter and washed well with water. The precipitate which was then dried under vacuum, amounted to 62 g. of analytically pure o-chloro-anilino-dithiocyanotriazine which had a melting point of 130° C. The yield was 96.8% of the theoretical.

*Example 5*

5.4 g. of p-chloro-anilino-dimercaptotriazine were dissolved in 200 ml. of 0.2 N sodium hydroxide. This solution was cooled to 0° C. and a solution of 5 g. of cyanogen bromide in 50 ml. of acetone was added to it dropwise. At this point the temperature was +2° C. The solution was stirred continuously for one hour. The resulting precipitate, p-chloro-anilino-dithiocyanotriazine was filtered off on a suction filter and dried. Its melting point was 192° C. The yield, 5.5 g., corresponded to 86% of the theoretical.

Other compounds which were produced in an analogous manner are:

β-Chloroethyl-amino dithiocyano triazine
Cyan-methyl-ammino dithiocyano triazine
Bisisopropyl-amino thiocyano triazine
Bisbutyl-amino thiocyano triazine
Bisethyl-amino-thiocyano triazine
Bismethyl-amino thiocyano triazine
Bisdimethyl-amino thiocyano triazine
Cyclohexyl-amino dithiocyano triazine
Diphenyl-amino dithiocyano triazine
Ethyl-amino dithiocyano triazine
Methyl-amino dithiocyano triazine
Ethyl-amino isopropyl-amino thiocyano triazine
Ethyl-amino butyl-amino thiocyano triazine
Ethyl-aminodimethyl-amino thiocyano triazine
Ethyl-amino diethyl-amino thiocyano triazine
Methyl-amino diethyl-amino thiocyano triazine
Diisopropyl-amino thiocyano triazine
Isopropyl-amino t. butyl-amino thiocyano triazine
n-Butyl-amino diethyl-amino thiocyano triazine

*Example 6*

388 g. of 2-ethyl-amino-4-tert. butyl-amino-6-mercapto-triazine were dissolved in 1710 ml. of n-sodium hydroxide. The solution was cooled at −5° C. The solution was stirred and 100 ml. of liquid cyanogen chloride were added. After 10 minutes the mixture becomes alkaline and it results a precipitate of 2-ethyl-amino-4-tert. butyl-amino-6-thiocyano triazine. The precipitate was filtered off, washed with water and dried, then recrystallized from a mixture of benzene and white spirit. Its melting point was 90 to 91° C. the yield 411 g. corresponding to 95.4% of the theoretical.

*Example 7*

15 g. of 2-dimethyl-amino-4-isopropyl-amino-6-mercapto-triazine were dissolved in 71 ml. of n-sodium hydroxide. The solution was cooled to −5° C. and mixed with 5.3 g. of liquid cyanogen chloride. The precipitate was treated as described in Example 6. Obtained were 16.6 g. of 2-dimethyl-amino-4-isopropyl-amino-6-thiocyano-triazine in the form of colorless crystals with a melting point of 117 to 118° C.

This application is a continuation-in-part of applications Serial No. 189,324, filed April 23, 1962, and Serial No. 33,649, filed June 3, 1960, which in turn is a continuation in part of applications Serial No. 719,997, filed March 10, 1958, now abandoned, and Serial No. 827,722, filed July 17, 1959, now Patent No. 2,996,505. This application is also a division of application Serial No. 218,576, filed August 22, 1962, now Patent No. 3,120,368.

I claim:

1. A triazine compound of the formula

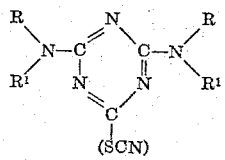

wherein R is lower alkyl and $R^1$ is selected from the group consisting of hydrogen and lower alkyl, the total number of the carbon atoms in the alkyl groups of such

groups being between 4 and 8.

2. A triazine compound of the formula

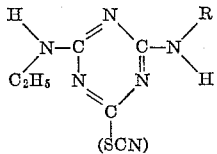

wherein R is lower alkyl and the total number of carbon atoms in the R group and the —C$_2$H$_5$ group is between 4 and 8.

3. A triazine compound of the formula

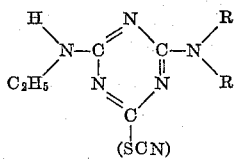

wherein R is lower alkyl and the total number of carbon atoms in the R groups and the —C$_2$H$_5$ group is between 4 and 8.

4. 2-thiocyano-4,6-bisisopropyl-amino-s-triazine.

5. 2 - thiocyano-4-ethyl-amino-6-tertiary butyl-amino-s-triazine.

6. 2 - thiocyano - 4 - ethyl-amino-6-diethyl-amino-s-triazine.

References Cited in the file of this patent

UNITED STATES PATENTS 2,650,220     Roemer _____ Aug. 25, 1953